United States Patent [19]

Williams

[11] 4,197,467
[45] Apr. 8, 1980

[54] DRY CONTAINMENT OF RADIOACTIVE MATERIALS

[75] Inventor: Charles E. Williams, Wilmington, Del.

[73] Assignee: N L Industries, Inc., Hightstown, N.J.

[21] Appl. No.: 861,558

[22] Filed: Dec. 16, 1977

[51] Int. Cl.² ............................................. G21F 5/00
[52] U.S. Cl. ................................... 250/506; 250/507
[58] Field of Search ................... 250/506, 507, 515; 176/73, 79, 87

[56] References Cited

U.S. PATENT DOCUMENTS

| | | | |
|---|---|---|---|
| 3,005,105 | 10/1961 | Lusk | 250/108 |
| 3,113,215 | 12/1963 | Allan | 250/108 |
| 3,175,087 | 3/1965 | Aupetit et al. | 250/507 |
| 3,483,381 | 12/1969 | Bonilla et al. | 250/108 |
| 3,531,644 | 9/1970 | Koster | 250/106 |
| 3,619,616 | 11/1971 | Smith | 250/507 |
| 3,770,964 | 11/1973 | Backus | 250/506 |
| 3,780,306 | 12/1973 | Anderson et al. | 250/428 |
| 4,016,096 | 4/1977 | Meyer | 250/507 |

Primary Examiner—Bruce C. Anderson
Attorney, Agent, or Firm—Fitzpatrick, Cella, Harper & Scinto

[57] ABSTRACT

A cask for the dry containment of radioactive fuel elements. The cask has a cover which contains valved drain and purge passageways. These passageways are sealed by after purge cover seals which are clamped over them and to the outer surface of the cover. The cover seals are tested by providing them with a pair of concentric ring seal elements squeezed between the cover seal and the outer surface of the cover and by forcing a gas under pressure into the annular region between the seal element.

11 Claims, 10 Drawing Figures

DRY CONTAINMENT OF RADIOACTIVE MATERIALS

BACKGROUND OF THE INVENTION

1. Field of the Invention

This invention relates to shipping containers for transporting radioactive materials, such as spent fuel rods from nuclear reactors. More particularly, this invention concerns a novel, hermetically sealable cask for transporting radioactive materials as well as novel methods for testing the integrity of the cask seals.

2. Description of the Prior Art

U.S. Pat. No. 3,619,616 describes a container for transporting radioactive materials such as nuclear reactor fuel rods. This container is made up of inner and outer shells with a layer of radiation absorptive material arranged between the shells. The interior of the container is filled with water into which the radioactive material is immersed; and special valve means are provided to accommodate expansion of the water in the container as a result of heating from the radioactive material.

Another type fuel container, which has been used by applicant's assignee, is designed to be purged of all water and to receive and maintain, by means of a hermetic seal, a moisture free gaseous atmosphere such as helium. This latter fuel container does not depend on a special valve to accommodate expansion due to heat since its atmosphere is maintained free of moisture and expansion is thereby held to a minimum.

Other United States patents showing various aspects of containers for radioactive materials are U.S. Pat. Nos. 3,113,215, 3,483,381, 3,770,964 and 3,780,306.

SUMMARY OF THE INVENTION

The present invention provides an improved radioactive materials container of the type which employs a hermetic seal to maintain a dry gaseous atmosphere. More particularly, the present invention provides novel sealing and testing arrangements by which it is possible, in a convenient and reliable manner, to introduce a dry gaseous atmosphere into the container, to seal the container and then to test the integrity of the container seals.

According to the present invention there is provided a container for the dry containment of radioactive materials which comprises a cannister-like body open at one end and forming an interior surrounded by radiation absorbing material. A removeable cover is arranged to be clamped to the container at its open end to form an annular seal therewith. A purging system is also provided. This purging system comprises valved purge and drain passageways which penetrate the container and extend into its interior. The purging system is characterized by novel sealing means comprising cap seals which extend over the outer end of the purge and drain passageways and seal around them against the outer surface of the container. These novel sealing means include a pair of concentric sealing elements, such as O-ring seals, and means for introducing pressurized air into the annular region between the concentric sealing elements. The integrity of the seal provided by each cap can be ascertained by noting any pressure drop which occurs as a result of gas leakage out from the region between the concentric seals.

The seal arrangements of this invention permit the container to be sealed and tested and then to be flushed, purged and charged with a moisture free gas following which a final seal and test operation are performed. Thus, the invention, in one aspect, relates to a method of preparing a container for the shipment of radioactive materials. This method comprises the steps of inserting radioactive materials into an open end of the container, positioning a cover over the open end and clamping it in place to form an annular seal, purging the interior of the container in the region of the annular seal by forcing gas into it via a purge passageway containing a first closure valve while draining liquid out of the container via a drain passageway containing a second closure valve, then checking the integrity of the annular seal by applying pressure to the interior of the container via one of the passageways while the other passageway is closed and while the region of the annular seal outside of the container is submerged in a liquid so that any leaks will be manifested as bubbles in the liquid. Thereafter the liquid remaining in the container is fully purged and replaced with a dry gas. The closure valves are both closed and cap-like after purge cover seals are placed over the outer ends of the purge and drain passageways and are clamped to the outer surface of the container to form further seals surrounding the passageways.

In a still further aspect, the present invention involves the additional step of testing the integrity of the cover seals by applying pressure to an annular region between two concentric ring-like sealing elements arranged between each cover seal and the container surface and by noting any change in the pressure.

There has thus been outlined rather broadly the more important features of the invention in order that the detailed description thereof that follows may be better understood, and in order that the present contribution to the art may be better appreciated. There are, of course, additional features of the invention that will be described more fully hereinafter. Those skilled in the art will appreciate that the conception on which the invention is based may readily be utilized as the basis for the design of other arrangements for carrying out the purposes of this invention. It is important, therefore, that the disclosure of this specification be regarded as including such equivalent arrangements as do not depart from the spirit and scope of the invention.

BRIEF DESCRIPTION OF THE DRAWINGS

A single embodiment of the invention has been chosen for purposes of illustration and description in the accompanying drawings which form a part of the specification and wherein.

Figure 1:
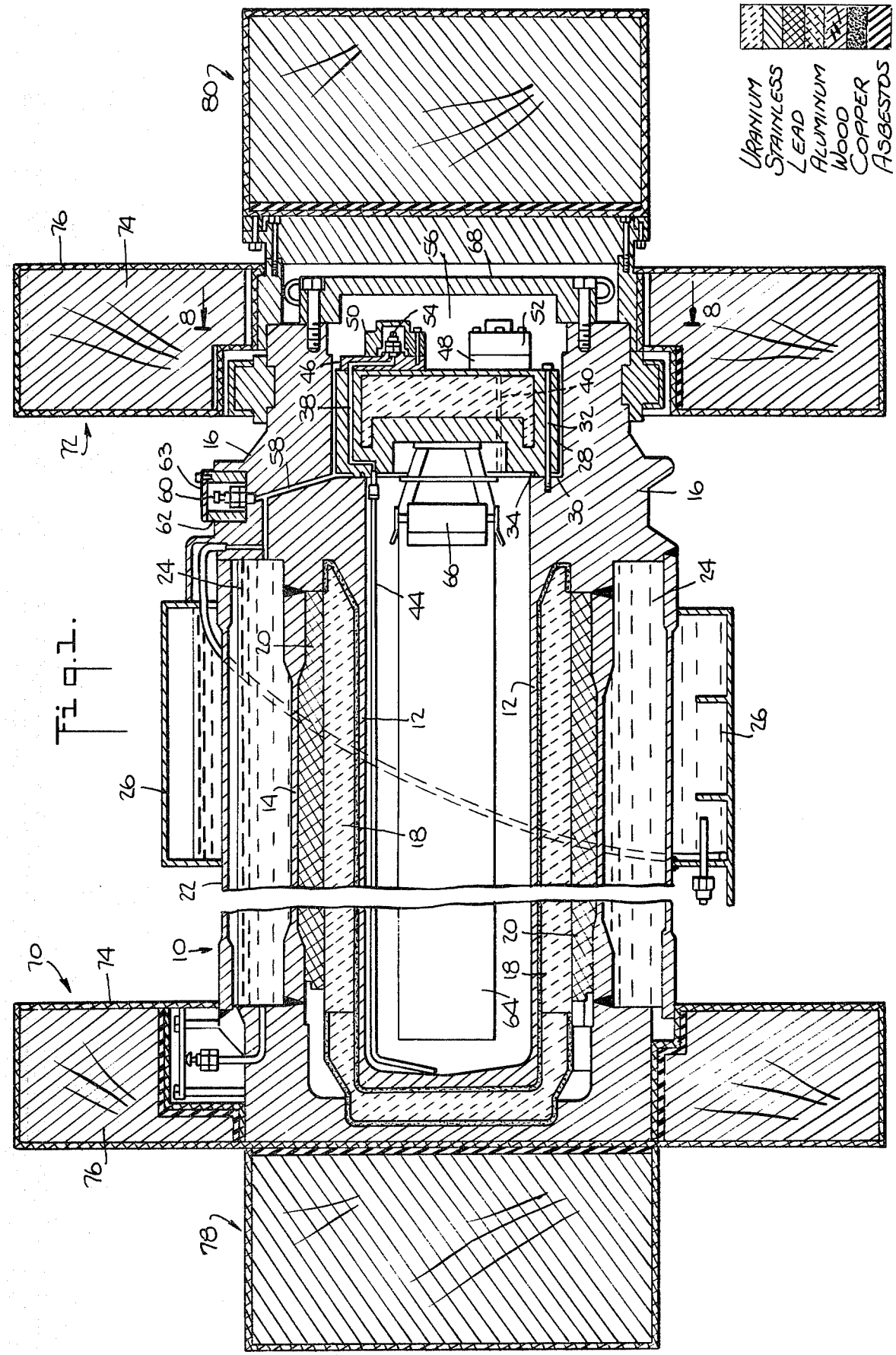
FIG. 1 is an elevation view, taken in section, and partially cut away, showing a fuel cask or container embodying the present invention.

The fuel cask or container of FIG. 1 is a cannister-like device made up of a stainless steel body 10 open at one end and closed at its opposite end. The body 10 comprises an inner shell 12 and a surrounding outer shell 14, integrally connected to each other at the open end of the body 10 via a massive annular stainless steel collar 16. As indicated by the cross hatching in FIG. 1, the space between the inner and outer shells 12 and 14 is occupied by an inner shielding layer 18 of uranium, and an outer shielding layer 20 of lead. The lead shielding layer 20 terminates short of the closed end of the device and the space between the shells 12 and 14 at the closed end is shielded with uranium. The layers 18 and 20 provide sufficient shielding to intercept substantially all of the radiation which emmanates from radioactive material contained within the cask. A stainless steel water jacket 22 surrounds the outer shell 14 and this jacket is filled with cooling water 24 which absorbs heat generated from within the cask as well as any radiation which does manage to pass through the shielding layers 18 and 20. An annular expansion tank 26 is mounted on the water jacket 22 and this serves to accommodate any expansion undergone by the cooling water 24 as it becomes heated.

The open end of the body 10 is provided with an inner cover 28, also of stainless steel, which rests on an annular shoulder 30 on the stainless steel collar 16. Inner cover bolts 32 extend through the cover 28 and are threaded into the collar 16 to clamp the cover in place. An annular seal 34 extends around the open end of the body 10 where it meets the cover 28 so that the interior of the cask is hermetically sealed when the cover is clamped in place. The cover 28 itself is provided with an inner core 36 of a suitable radiation absorbing material such as uranium. A drain passageway 38 and a purge passageway 40 form penetrations which extend through the stainless steel portion of the inner cover 28. The purge passageway 40 terminates at the inner surface of the cover 28; however, the drain passageway 38 is connected by means of a coupling 42 to a drain line 44 which extends down inside of and opens at the closed end of the body 10. The outer ends of the drain and purge passageways 38 and 40 extend into associated cover plates 46 and 48 which are welded to the outer surface of the inner cover 28. Cap-like, after purge cover seals 50 and 52 are bolted over the upper surface of the cover plates 46 and 48. As can be seen in FIG. 1 the drain passageway 38 terminates at a drain valve connection 54 which is fitted into the cover plate 46 and which is covered over by the cover seal 50. The purge passageway 40 also terminates at a similar purge valve connection 55 (see FIG. 9) which is covered over by the cover seal 52. The valve connections 54 and 55 permit the rapid coupling of a fluid line to the respective passageways 38 and 40 and they open the passageways to fluid communication with the line when it is so connected. On the other hand, when the line is disconnected from the valved connection, the valved connection seals its associated passageway so that fluids may not flow into or out from the interior of the cask. The valve connections 54 and 55 are generally referred to as "quick-disconnect" valved couplings and they may, for example, be of the same construction as those sold by Snap-Tite Inc. of Union City, Pa. under the description "E Series Quick-Disconnect Couplings".

It will be noted in FIG. 1 that the annular collar 16 of the body 10 extends longitudinally from the shoulder 30 to a location out beyond the inner cover 28 and beyond the cover seals 50 and 52. This arrangement forms a well 56 above and around the periphery of the inner cover 28 and which overlies the annular seal 34. A well drain passageway 58 extends out from the bottom of the well 56 to a well drain valve 60 mounted in the side of the collar 16. The well drain valve 60 may also be a quick-disconnect valve similar to the valved connections 54 and 55. A sleeve 62 projects out from the collar 16 to surround the drain valve 60 and a drain cover 63 is bolted to the sleeve to enclose the drain valve.

A fuel rod basket 64 is positioned in the body 10 and is spaced from the inner cover 28 by means of a spacer member 66. This arrangement maintains fuel rods (which are carried in the basket 64) centered within the cask during shipment.

The inner cover 28 and the cover seals 50 and 52 are enclosed by means of a stainless steel outer cover 68 which is bolted to the outermost end surface of the collar 16.

Flange-like annular impact collars 70 and 72 are mounted on each end of the cask to protect it from shock in case of collision or accidental dropping. These impact collars are made up of a core 74 of balsa wood and an outer skin 76 of aluminium. In addition to the collars 70 and 72 there are provided impact caps 78 and 80 of similar construction on the ends of the cask to protect the cask against end directed impacts. The specific construction of the impact collars 70 and 72 and the caps 78 and 80 are not part of the present invention and so will not be described herein.

Except for the after purge sealing arrangements comprising the plates 46 and 48 and the cover seals 50 and 52, the above described cask construction is in accordance with the prior art. The novel features of this invention reside in the after purge sealing arrangements and the testing thereof as will be described more fully hereinafter.

Figure 2:
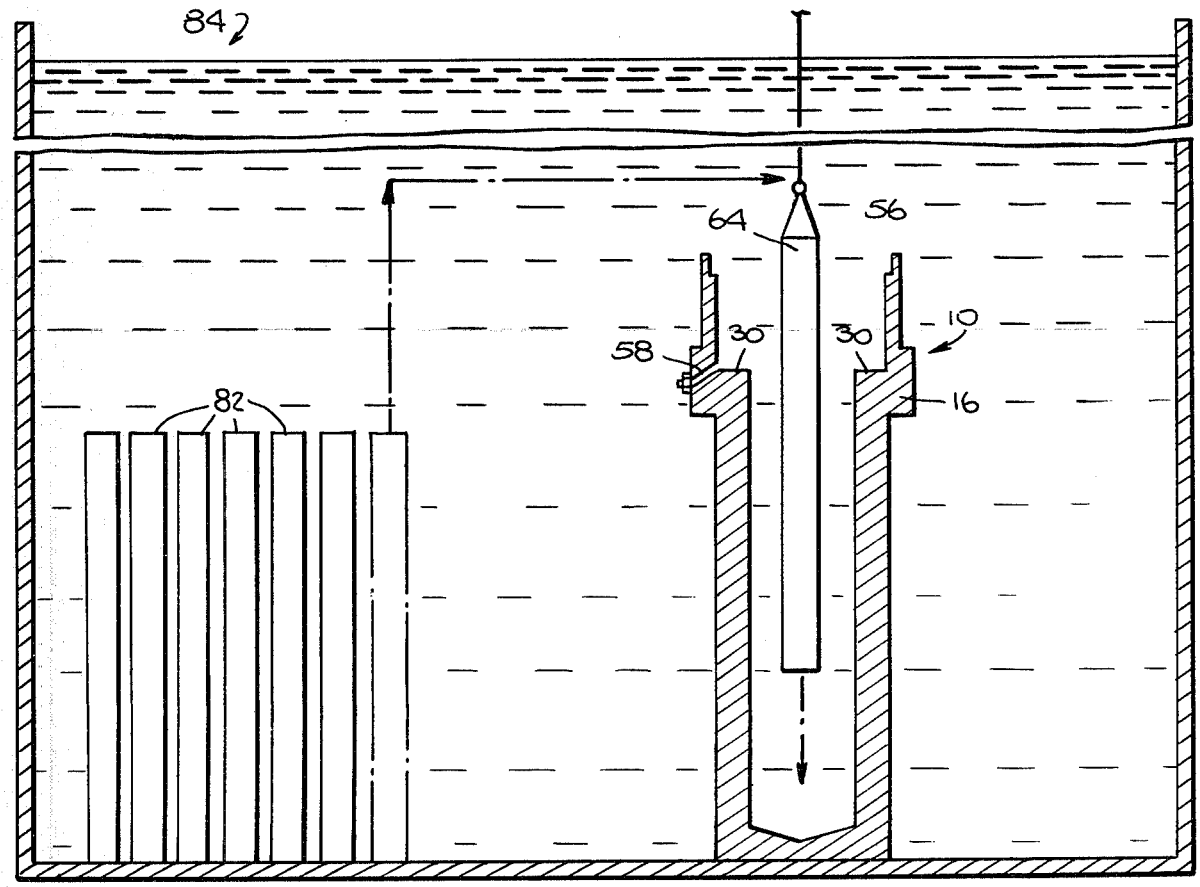
FIG. 2 is a diagramatic elevational view illustrating the loading of nuclear fuel rods into the cask of FIG. 1.
Figure 3:
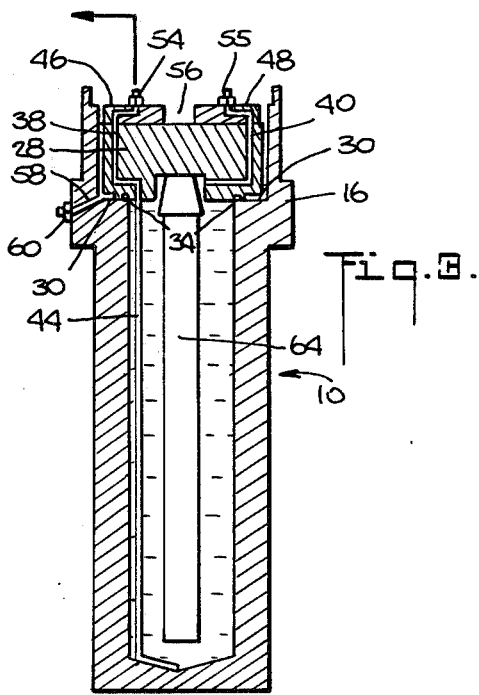
FIGS. 3–6 are diagramatic elevational views illustrating the steps in closing, sealing, purging and testing the cask of FIG. 1 after it has been loaded with nuclear fuel rods.

The fuel cask is loaded with radioactive fuel rods in the manner illustrated diagramatically in FIG. 2. As there shown, fuel rods 82 from a nuclear reactor (not shown) are stored temporarily in a fuel pool 84. The pool 84 is a tank of water, about forty feet (12 meters) in depth. The fuel rods 82 are about 15 feet (4.5 meters) long. As shown in FIG. 2 the cask body 10 is positioned vertically in bottom of the pool 84 with its open end facing upwardly. The fuel rods 82 are then transferred, while submerged, into the fuel rod basket 64 in the cask. Thereafter the inner cover 28 is fitted onto the annular shoulder 30 to close the cask; and the cask is removed from the pool. The cover bolts 32 are then inserted and tightened, as shown in FIG. 3, to clamp the inner cover in place and to complete the annular seal 34.

Figure 4:
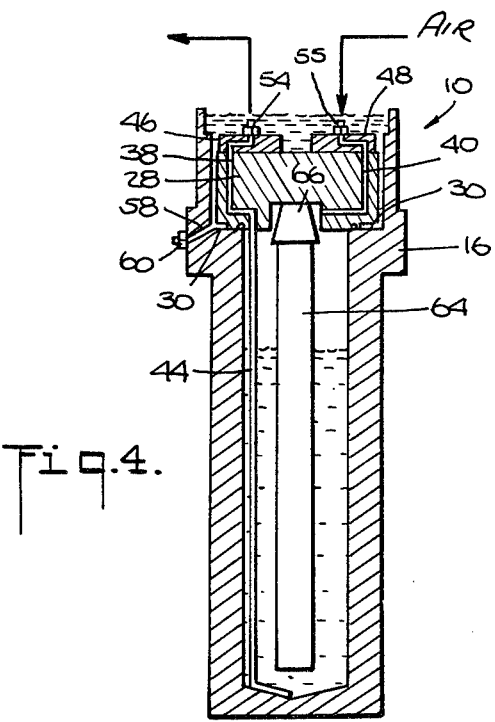

After the cover 28 has been clamped in place the annular seal 34 is tested while the cask is out of but close to, the pool 84. Before carrying out this seal test the region of the cask interior adjacent the annular seal 34 is purged of water and is replaced by air. This partial purging operation, which is illustrated in FIG. 4, is carried out by first opening the drain valve connection 54 and coupling the purge valve connection 55 to a source of pressurized air (not shown). The air pressurizes the interior of the cask and drives water up through the drain line 44, the drain passageway and out through the drain valve connection 54. After the partial purge, the well drain valve 60 is closed and the well 56 is filled with demineralized water. The drain valve connection 55 remains open until sufficient water is removed from the interior of the cask expose the entire region of the annular seal 34 inside the cask to the pressurized air, as shown in FIG. 4. Thereafter the drain valve connection 54 is closed and the application of air to the purge valve connection 55 is continued until the pressure inside the cask builds up to some predetermined amount, e.g., fifteen pounds per square inch (1 kg/cm$^2$). The purge valve connection 55 is then closed.

Should there be any leakage through the annular seal 34, the pressurized air trapped inside the cask will pass up through the leak and into the water filled well 56 above the cover 28 and will be readily visible in the form of bubbles in the well.

Preferably, the valve connections 54 and 55 are submerged in the water filled well 56 during the test of the seal 34 so that any leakage which may be taking place through these valve connections will also be detected. It is possible that undetected leakage of air through one or both of the valve connections 54 and 55 might be large enough to prevent gas from passing through a small leak in the annular seal 34. Thus, by ensuring that there is no leakage through the valve connections 54 and 55, one can make a reliable test of the integrity of the annular seal 34.

If any leakage is found in either the annular seal 34 or in one of the valve connections 54 and 55, the cover 28 may be removed and replaced before the cask is removed from the pool. On the other hand if no leakage is evident the cask may be purged of its remaining water content by opening the drain valve connection 54 and by continuing to supply pressurized air into the cask via the purge valve connection 55 so that it displaces and forces the remaining water out through the drain valve connection. During this time the well drain valve 60 is also open to allow water to drain out from the well 56.

After the cask has been evacuated as described above, it is flushed with demineralized water to remove any loose radioactive particles. This flushing is carried out by supplying demineralized water to the purge valve connection 55 while the drain valve connection 54 remains open. During or after this flushing operation the exterior of the cask may be hosed down with demineralized water to remove any loose radioactive dust or debris.

Figure 5:
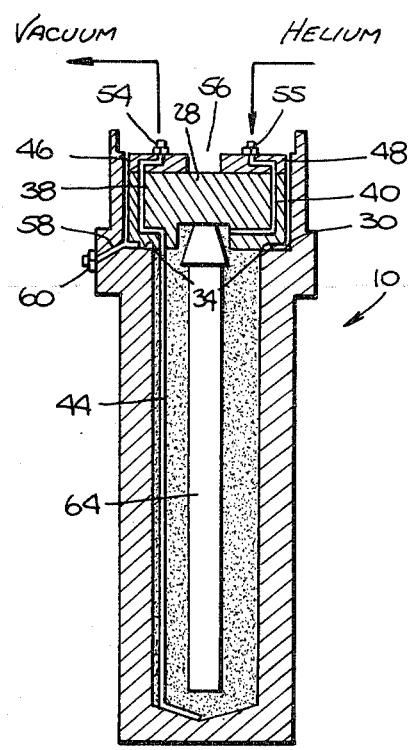

After the flushing operation is completed, the interior of the cask is again purged of liquid as shown in FIG. 5. In this operation air is applied to the purge valve connection 55 to drive water out through the drain valve connection 54. Thereafter the purge valve connection 55 is closed and a vacuum is drawn at the drain valve connection 54 to remove the last traces of water from the interior of the cask. The drain valve connection 54 is then closed and helium is introduced through the purge valve connection 55. In this case however, the helium gas is admitted only to the extent that it brings the interior of the cask up to atmospheric pressure.

Figure 6:
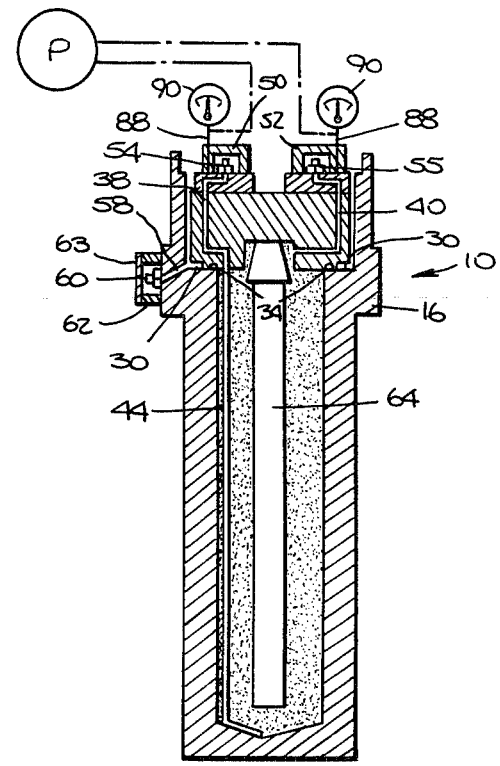

Although, as above described, the drain and purge valve connections 54 and 55 are subjected to a leakage test at the time when the annular seal 34 is tested, that leakage test cannot be relied upon to assure the integrity of the seal provided by these two valve connections after the flushing, purging and helium filling operations have been carried out. The reason for this is that the flushing, purging and helium filling operations required that both the drain and purge valve connections 54 and 55 be opened and closed after the above described test of the annular seal 34. This opening and closing makes possible the introduction of new leakage through the drain and purge valves 54 and 55. In order to insure against any such new leakage the after purge cover seals are provided to extend over each valve connection 54 and 55 and to be clamped to the cask so as to form a circumferential fluid tight seal around each valve connection. The after purge cover seals 50 and 52 are installed and tested as illustrated in FIG. 6. As can be seen, the cover seals 50 and 52 are installed by bolting them to the outer surface of the cover 28 so that they surround the drain and purge valve connections 54 and 55 and seal around them against the outer surface of the cover. The cover seals 50 and 52 are tested by applying pressurized air to a terminal 88 on each cover seal, and monitoring, by means of a pressure gage 90, any changes in pressure which occur over a period of time following such pressure application.

Figure 7:
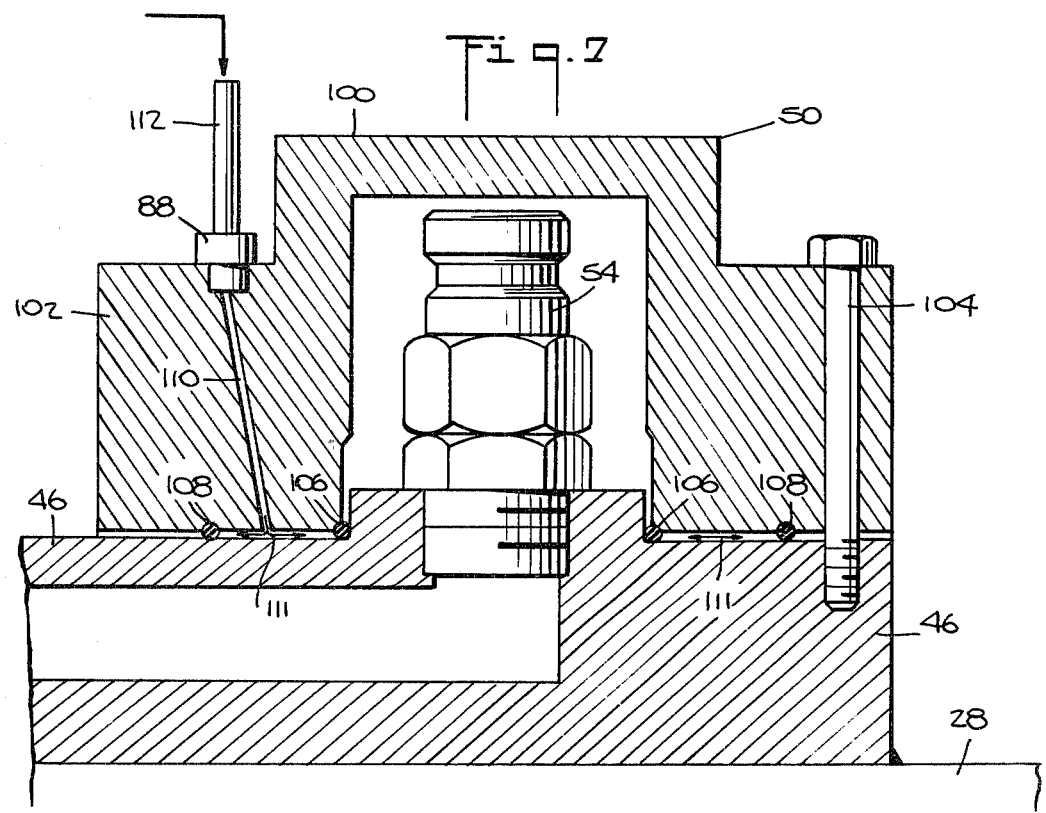
FIG. 7 is an enlarged fragmentary section view showing the details of a cover seal, purging passageways and after purge sealing means employed in the cask of FIG. 1.
Figure 8:
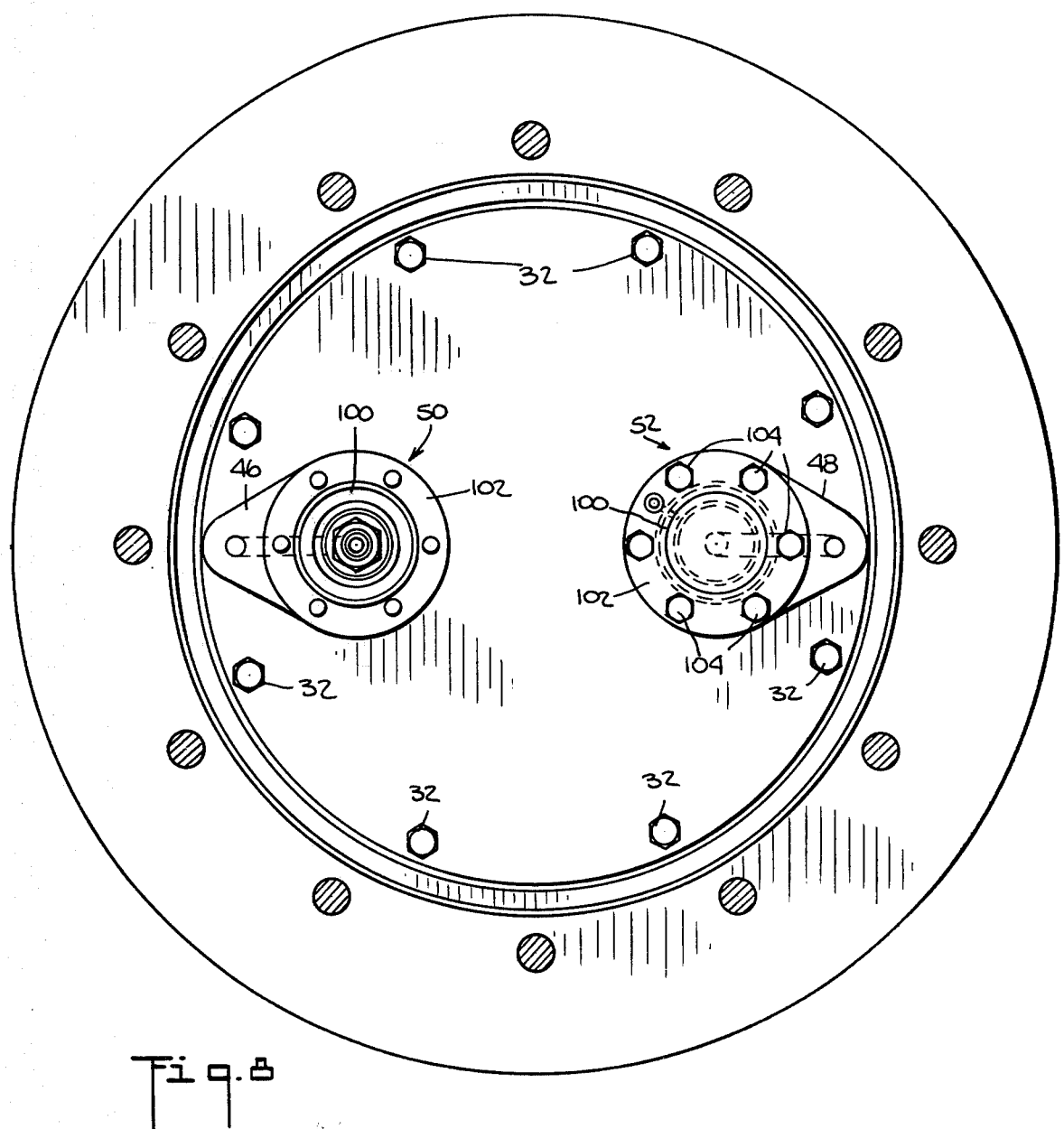
FIG. 8 is a top plan view taken along line 8—8 of FIG. 1.
Figure 9:
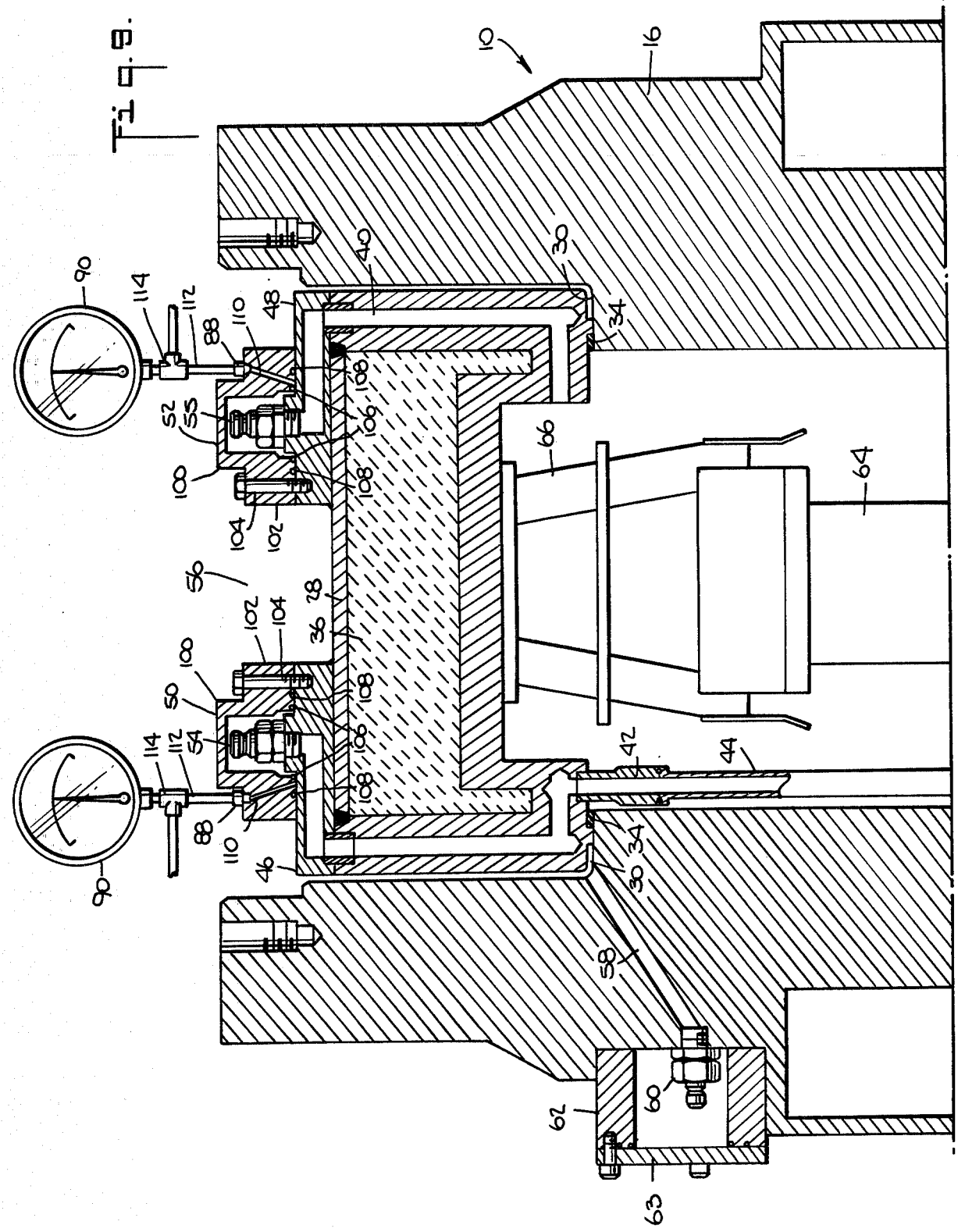
FIG. 9 is a further enlarged fragmentary section view showing in greater detail the after purge sealing means of FIG. 7.

FIGS. 7-9 show the details of the cover seals 50 and 52, the manner in which they are installed and the manner in which they are tested. As can be seen in these drawings, each cover seal comprises a central hollow portion 100, open at the bottom and closed at the top, which fits over the valve connections 54 and 55, and an annular flange portion 102, which extends out from the bottom of the central portion 100 and which lies flat against the associated cover plate 46 or 48. The flange portion 102 is provided with a series of bolt holes around its periphery. Cover seal bolts 104 extend through these holes and are threaded into the cover plates 46 and 48 to clamp the cover seals 50 and 52 to the plates 46 and 48. The bottom surface of the flange portion 102 of each cover seal is provided with a pair of concentric inner and outer O-ring seal elements 106 and 108 which are squeezed between the flange portion 102 of each cover seal 50 and 52 and the upper surface of the plates 46 and 48. It will be appreciated that these O-ring seal elements cooperate with the cover seal flange portions 102 and the plates 46 and 48 to form a integral seal which fully surrounds the valve connections 54 and 55 and seals them off from the exterior of the cask.

The inner O-ring seal element 106 is made of metal, preferably an alloy such as Inconel X, to withstand not only the temperatures which are normally encountered during transportation and storage of the cask but also those higher temperatures which might be attained in the event of an accident.

The outer O-ring seal element 108 may be of any conventional elastomeric O-ring seal material. The outer seal element 108 is not relied upon to maintain sealing during storage or transportation but instead it is used solely to test the inner O-ring seal element 106 as will be explained hereinbelow.

A test bore 110 is formed in the flange portion 102 of each of the cover seals 50 and 52. This test bore extends from the terminal 88 at the upper surface of the flange portion down to its bottom surface at a location between the inner and outer seals 106 and 108. The flange portion 102 may also be provided with a circular recess 111 (FIG. 7) about its bottom surface between the inner and outer O-ring seal elements 106 and 108 so that the test bore 110 will be in full fluid communication with the entire region between the elements 106 and 108.

A pressure line 112 is connected to the terminal 88 and extends up to the pressure gage 90. A Tee connection 114 is provided in the pressure line 112 and is arranged to receive pressurized air from an external source (not shown).

In carrying out a pressure test of the cover seals 50 and 52, pressurized air is applied via the Tee connection 114, the pressure line 112, the terminal 88 and the test bore 110 to the region 111 between the inner and outer O-ring seal elements 106 and 108. Should any leakage occur through either or both O-ring seal elements, the pressure in the line 112 will drop and this will be detected by the pressure gage 90. In such case the associated cover seal 50 or 52 may be removed and its O-ring seal elements 106 and 108 replaced, or if necessary, the entire cover seal may be replaced. On the other hand, if both O-ring seal elements are free of leaks, the pressure reading or the gage 90 will remain steady. At this point the integrity of seal provided by the cask is assured and the fuel rods which had been loaded into the cask will thereafter be isolated from the external environment. Accordingly, in the event of a temperature rise in the interior of the cask, any associated pressure rise will be minimized.

It will be understood that the outer O-ring seal elements 108 are not utilized to seal the interior of the cover seals 50 and 52. Instead these outer O-ring seal elements serve only to hold the pressure which is applied to the annular space 111 between the elements 106 and 108 during testing of the cover seals. After this testing is complete no further function is served by the outer O-ring seal elements 108.

Figure 10:
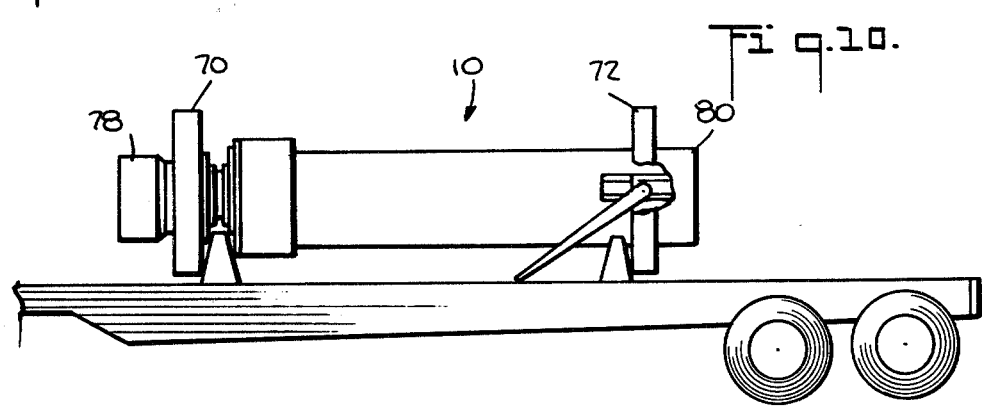
FIG. 10 is an overall elevation view of a fuel cask according to the present invention mounted on a truck bed for shipment.

After the cask has been loaded, sealed, purged and pressure tested as above described, the outer cover 68, the impact collars 70 and 72 and the impact caps 78 and 80 and installed. The cask is then mounted, in horizontal position, on a vehicle, such as a truck trailer bed 116, as shown in FIG. 10, for transportation.

It will be appreciated that the cask construction and testing techniques described herein permit the sealing of radioactive materials in a dry atmosphere in a simple yet reliable manner. Moreover, the integrity of the hermetic seal which is provided by these arrangements can be ascertained with a high degree of certainty. It will also be appreciated that the sealing and pressure testing arrangements described herein are readily adaptable to use on casks which are designed to carry radioactive materials on railway cars.

Having thus described the invention with particular reference to the preferred forms thereof, it will be obvious to those skilled in the art to which the invention pertains that various changes and modification may be made therein without departing from the spirit and scope of the invention as defined by the claims appended hereto.

What is claimed and desired to be secured by Letters Patent is:

1. A shipping container for dry containment of radioactive materials, said container comprising
    a cannister-like body open at one end for receiving radioactive materials to be shipped,
    a radiation absorbing material supported by said body to surround the interior thereof,
    a removeable cover shaped to fit over and close said one end of said body and to form a annular seal therewith,
    means for clamping said cover to said body at said one end to form a gas tight vessel for containing said radioactive materials,
    a fluid purging system for controlling the atmospheric conditions inside said vessel, said fluid purging system including fluid passageway means extending into said vessel and communicating between the interior and exterior thereof, a fluid flow control valve arranged along said passageway at the exterior of said vessel, and
    an after purge seal cap means comprising a cover seal extending over said valve and clamped to said vessel and a circumferential fluid tight seal surrounding said passageway and clamped between said cap and said vessel.

2. A shipping container according to claim 1 wherein said fluid passageway means comprises a purge passageway and a drain passageway both of which extend through said cover and wherein said after purge seal means is clamped to the outer surface of said cover.

3. A shipping container according to claim 1 wherein said after purge seal means comprises a hollow central portion closed at the top and open at the bottom to fit over the outer end of said fluid passageway means and an annular flange portion which lies flat against an outer surface of said vessel.

4. A shipping container according to claim 3 wherein said after purge seal means includes a pair of concentric ring shaped seal elements positioned to be squeezed between the under surface of said annular flange and said outer surface of said vessel and wherein a test passageway extends through said flange to the region of its under surface between said seal elements.

5. A shipping container according to claim 4 wherein the innermost of said ring shaped seal elements is of a heat resistant substance and wherein the outermost of said ring shaped seal elements is of an elastomeric substance.

6. A shipping container according to claim 5 wherein said after purge seal means is clamped to said vessel by a series of bolts extending through said flange portion and distributed circumferentially thereabout outside said ring shaped seal elements.

7. A shipping container according to claim 1 wherein said body is formed with a well communicating with the exterior region of said annular seal and wherein said fluid passageway means terminates within said well.

8. A method of preparing radioactive materials for transportation, said method comprising the steps of
    inserting said materials into an open end of a radiation protective fuel cask,
    positioning a cover over said one end of said fuel cask to close same and clamping said cover in place to seal the interior thereof,
    purging the interior of said fuel cask by forcing a gas into said cask via a first penetration passageway containing a first closure valve while venting liquid from said cask via a second passageway containing a second closure valve,
    closing said first and second closure valves, and
    clamping after purge sealing cap means to the outer surface of said cask to cover said penetration passageways and said closure valves and to seal said passageways by means of annular seals surrounding said passageways at said outer surface.

9. A method according to claim 8 wherein, subsequent to clamping said after purge sealing cap means, pressurized air is forced into an annular region between two concentric O-ring seal elements squeezed between said cap means and said outer surface.

10. A method according to claim 8 wherein individual after purge sealing caps are clamped to said outer surface to cover and seal each of said passageways.

11. A method of storing radioactive fuel rods for transportation, said method comprising the steps of
- submerging a radiation resistant fuel cask, open at one end, into a pool containing said fuel rods and inserting said fuel rods into said cask while submerged,
- positioning a cover over said one end of said fuel cask to close same and clamping said cover in place to form an annular seal with said cask at said open end,
- purging the interior of said fuel cask of liquid from the region of said annular seal by forcing air into said cask via a first penetration passageway containing a first closure valve while venting liquid from said cask via a second penetration passageway containing a second closure valve,
- checking the integrity of said annular seal by applying pressure through one of said penetration passageways while the valve contained in the other penetration passageway is closed and while the region of said annular seal outside said cask is submerged in a liquid so that any leakage through said annular seal will be manifested in the form of gas bubbles in said liquid,
- therefter continuing to purge the interior of said cask via said first and second penetration passageways until all moisture is removed from said cask,
- closing said first and second closure valves,
- clamping after purge cover seals to the outer surface of said cask to cover said penetration passageways and said closure valves and to seal said passgeways by means of further annular seals surrounding them at said outer surface, and
- testing the integrity of said further annular seals by applying pressure to the region between each said further annular seal and an outer concentric seal formed between each cap and the outer surface of said cask.

* * * * *